United States Patent [19]

Neshumaev et al.

[11] 3,812,763

[45] May 28, 1974

[54] CUTTING TOOL

[76] Inventors: Anatoly Dmitrievich Neshumaev, ulitsa Kremenetskaya, 4/9, kv. 37; Boris Konstantinovich Goncharov, ulitsa Entuziastov, 45, kv. 107; Anatoly Alexeevich Smolyar, ulitsa Entuziastov, 45, kv. 104; Leonid Nikolaevich Chigir, ulitsa Scherbakova, 59, kv. 10, all of Kiev, U.S.S.R.

[22] Filed: Mar. 30, 1971

[21] Appl. No.: 129,379

[52] U.S. Cl.................. 90/11 A, 51/348, 408/180
[51] Int. Cl............................................. B23q 3/16
[58] Field of Search .......... 408/146, 147, 157, 159, 408/180; 90/11 A; 51/238, 348

[56] References Cited
UNITED STATES PATENTS
174,808   3/1876   Gunn ................................... 51/348
2,141,491 12/1938  Searles................................. 51/348
2,273,228  2/1942  Smith................................. 408/147
2,770,173 11/1956  Ochse................................. 90/11 A Primary Examiner—Francis S. Husar
Attorney, Agent, or Firm—Waters, Roditi, Schwartz & Nissen

[57] ABSTRACT

A tool of the milling cutter-type with a variable angle of inclination of the cutting members mounted on levers one end of which is pivotally connected to a holder and the other end is connected to a rod mounted coaxially to this holder, characterized in that the holder has a tail to provide for a direct connection with the machine spindle and also in that the rod can be secured in the stationary member of the machine.

3 Claims, 3 Drawing Figures

CUTTING TOOL

The present invention relates to milling cutter-type cutting tools for working shaped surfaces.

The proposed invention can be most effectively used in the process of working of linear surfaces limited by curved contours having low radii of curvature.

Known in the art are milling cutter-type cutting tools intended for working shaped surfaces comprising a holder with a rod arranged coaxially with a possibility of displacement relative to each other in an axial direction and levers carrying cutting members, each of which being at one end pivotally connected to the holder and at the other end connected to the rod for changing the angle of inclination of the cutting members relative to the axis of rotation of the tool in the process of relative displacement of said holder and said rod.

In these known devices the rod is made in the form of a splined shaft having one end directly connected to the spindle of the machine capable of moving in an axial direction and the other end coupled to the holder and transmitting the torque from the spindle to this holder. During its axial displacement the rod deflects the levers carrying the cutting members, thus changing the angle of inclination thereof relative to the axis of rotation of the tool. Thus, the rod simultaneously takes the force of the spindle torque and the forces acting on the cutting members in the process of cutting. Therefore, the linear dimensions of the rod carrying such a load must provide for adequate strength and rigidity thereof. This is associated with an increase in the linear dimensions of the holder and, therefore, the diameter of the tool as a whole.

The tool having a high diameter offers reduced facilities in the working of shaped surfaces limited by curved contours due to the fact that the minimum radii of curvatures of these contours should be higher than or at least equal to a half of the possible maximum diameter of the tool. The experiments have shown that it is often necessary to work shaped surfaces limited by contours having low radii of curvature. However, a reduction of the diameter of the known tools is associated with a decrease in the linear dimensions of the rod and this adversely affects the accuracy of working of the articles due to a low rigidity of such a rod.

Furthermore, the kinematic connection of the cutting members with the machine spindle through the rod reduces the accuracy of the working due to the beat of the holder relative to the axis of rotation of the spindle, which is caused by a gap in the coupled pair "holder-rod," and also due to the fact that the rod takes the cutting forces.

In the known tools the holder is provided with radial steps, by means of which it is fixed in the housing on radial-thrust bearings. Such a construction is associated with large overall dimensions and inconvenient shape of the tool which hinder its installation and operation.

An object of the present invention is to eliminate the above-mentioned disadvantages.

Another object of the present invention is to provide a milling cutter-type cutting tool which has such a kinematic coupling between the cutting members and the machine spindle which would permit the tool to have better technological facilities and to provide for a higher accuracy in working the articles than the known tool of the same type.

This and other objects are attained due to the fact that, according to the invention, the holder portion opposite to that carrying the fixed levers has a tail to make direct connection of the holder with the machine spindle, while the rod extending through the holder, one end of which is pivotally connected to the levers, has another end opposite to the first end and adapted to be fixed in the stationary member of the machine.

These objects are achieved most successively in the case when the rod end secured in the stationary member of the machine is provided with a roller bearing whose stationary ring is secured in this stationary member.

It is also expedient to rigidly secure one end of the rod in the stationary member of the machine, while the pivot connection of the other end thereof with the levers carrying the cutting members is effected through a bearing the stationary ring of which is secured on the rod.

Due to such a construction the proposed cutting tool provides for a high accuracy of working of articles and offers wide technological facilities.

Other objects and advantages of the invention will be apparent from the followed description of some embodiments of the invention, reference being made to the accompanying drawings, in which.

Figure 1:
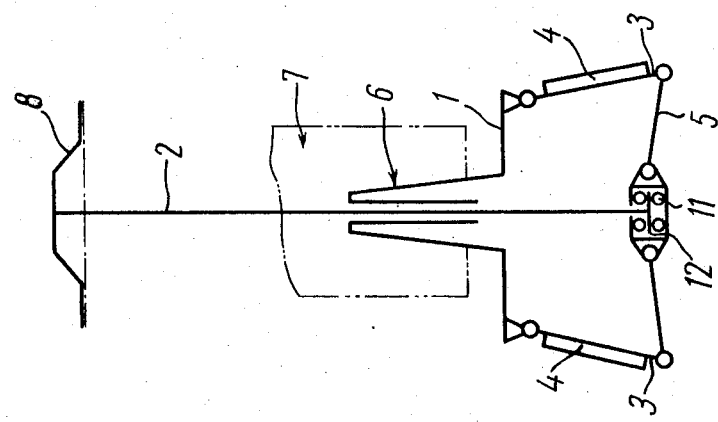
FIG. 1 is a kinematic diagram of the milling cutter-type cutting tool according to the invention, in which the rod rotates together with the holder.
Figure 2:
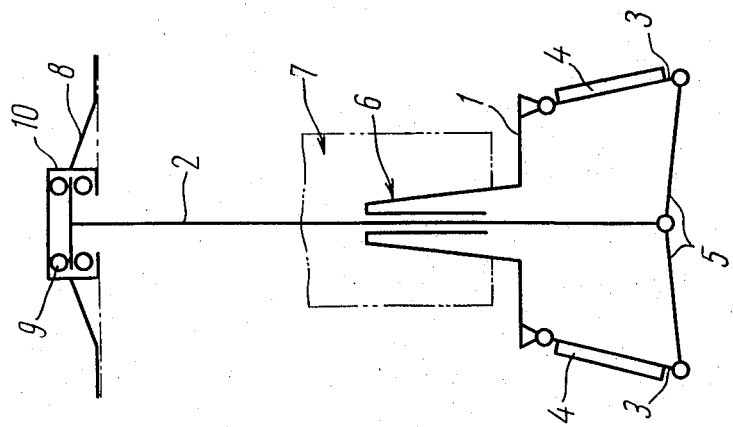
FIG. 2 is a kinematic diagram of the cutting tool according to the invention, in which the rod is fixed against rotation with the holder.
Figure 3:
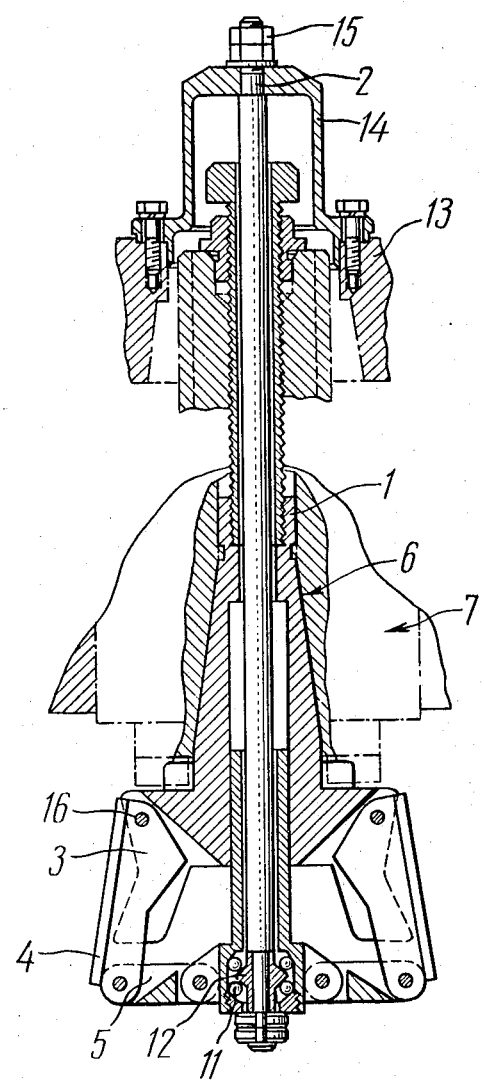
FIG. 3 is a longitudinal section of the cutting tool according to the invention.

The proposed milling cutter-type cutting tool for working shaped surfaces comprises a holder 1 (FIGS. 1-3) with a rod 2 arranged coaxially and capable of displacing relative to each other, and levers 3 carrying the cutting members 4 which at one end are pivotally connected to the holder 1 and at the other end are connected through bars 5 to the rod 2 for changing the angle of inclination of the cutting members 4 relative to the axis of rotation of the tool in the process of axial movement of the holder 1.

According to the invention, the portion of the holder 1 opposite to the portion securing the levers 3 is provided with a tail 6 for direct coupling with a spindle 7, while the rod 2 extending through the holder 1 has one end pivotally connected to the lever 3 and the opposite end secured in the stationary member 8 (FIGS. 1 and 2) of the machine.

Such a construction of the proposed tool makes it possible to mount the holder in the machine spindle, which holder thereby, directly imparts the working motion to the cutting members and, when displaced in an axial direction, changes the angle of inclination of these members relative to the axis of rotation of the tool.

Such a kinematic coupling of the cutting members with the machine spindle provides for a high accuracy of the working, because the direct connection of the holder with the machine spindle reduces the beat of the tool relative to the axis of rotation thereof.

The end of the rod opposite to that pivotally connected to the levers may be equipped with a roller bearing 9 (FIG. 1) whose stationary ring 10 is secured on the stationary member 8 of the machine. Such mounting of the rod 2 allows the rolling bearing 9 to be positioned beyond the holder 1 and this makes it possible to reduce its linear diameter and, therefore, the diameter of the tool and to increase the range of angular deflections of the cutting members 4 relative to the axis of rotation of the tool. This widens the technological facilities of the tool permitting it to be used for working linear surfaces limited by curved contours having small radii of curvature and widely variable angles of inclination of the generating line along these contours.

One end of the rod may be secured in the stationary member 8 so that the rod 2 itself (FIG. 2) does not rotate, in which case the other end of the rod is pivotally connected to the levers 3 through the roller bearing II whose stationary ring is secured on the rod.

This provides for easy fixing and removal of the tool, particularly in the machines where the stationary member (stationary spindle head) features limited facilities for securing therein a rod with a roller bearing.

The proposed tool operates as follows.

The tail 6 of the holder 1 (FIG. 3) is mounted in the spindle 7 of the machine, while the end of the rod 2 opposite to the end thereof connected to the levers 3 is secured on the stationary spindle head 13 in the cup 14 by means of nuts 15. Then the spindle 7 is rotated and the holder 1 mounted in the spindle 7 imparts the rotary motion to the cutting members 4.

To change the angle of inclination of he cutting members 4 relative to the axis of rotation of the tool, the holder 1 is displaced in an axial direction relative to the rod 2.

During the axial displacement of the holder 1 the levers 3 carrying the cutting members 4 move together with the holder.

Owing to the fact that these levers at their other ends through the bars 5 and the bearing II are pivotally connected to the rod having no axial displacements, the levers 3 also rotate relative to the pivot joints 16. In this case the cutting members 4 secured on these levers change the angle of inclination relative to the axis of rotation of the tool.

We claim:

1. A milling cutter-type cutting tool for working shaped surfaces positioned in a spindle of a milling machine or the like, comprising in combination: a holder and a rod mounted coaxially relative thereto, said holder being mounted for axial displacement relative to said rod; cutting members; levers carrying said cutting members and having one of the ends thereof pivotally connected to said holder, the other ends of said levers being connected to said rod for changing the angle of inclination of said cutting members relative to the axis of rotation of the tool in the process of axial displacement of said holder; said holder at the portion thereof opposite to the portion of the pivot joints of said levers having a tail for direct connection with the machine spindle; the end of said rod opposite to the end pivotally connected to said levers having means for fastening to a stationary member of the machine.

2. A cutting tool as claimed in claim 1, in which the end of the rod having means for fastening to a stationary member of the machine carries a roller bearing having a stationary ring securable in the stationary member.

3. A cutting tool as claimed in claim 1, in which said one of the rod is rigidly secured in the stationary member of said one of said rod is pivotally connected to the levers through a roller bearing having a stationary ring secured on the rod.

* * * * *